United States Patent
Hwang et al.

(10) Patent No.: US 9,250,085 B2
(45) Date of Patent: Feb. 2, 2016

(54) GEO-LOCATION SERVICES

(71) Applicant: Vivint, Inc., Provo, UT (US)

(72) Inventors: Jungtaik Hwang, Draper, UT (US); Matthew J. Eyring, Provo, UT (US); James E. Nye, Alpine, UT (US); Jeremy B. Warren, Draper, UT (US)

(73) Assignee: VIVINT, INC., Provo, UT (US)

( * ) Notice: Subject to any disclaimer, the term of this patent is extended or adjusted under 35 U.S.C. 154(b) by 0 days.

(21) Appl. No.: 14/304,805

(22) Filed: Jun. 13, 2014

(65) Prior Publication Data

US 2015/0024790 A1    Jan. 22, 2015

Related U.S. Application Data

(60) Provisional application No. 61/847,426, filed on Jul. 17, 2013.

(51) Int. Cl.
| | | |
|---|---|---|
| H04W 24/00 | (2009.01) | |
| G01C 21/20 | (2006.01) | |
| G08B 25/10 | (2006.01) | |
| H04W 4/02 | (2009.01) | |
| G01C 21/36 | (2006.01) | |
| G06Q 10/10 | (2012.01) | |
| G08B 5/22 | (2006.01) | |
| G08B 21/18 | (2006.01) | |
| G08B 27/00 | (2006.01) | |
| G01C 21/34 | (2006.01) | |

(Continued)

(52) U.S. Cl.
CPC ............... *G01C 21/20* (2013.01); *G01C 21/34* (2013.01); *G01C 21/362* (2013.01); *G06Q 10/1095* (2013.01); *G08B 5/222* (2013.01); *G08B 21/18* (2013.01); *G08B 25/10* (2013.01); *G08B 27/00* (2013.01); *H04W 4/021* (2013.01); *H04W 4/023* (2013.01); *H04W 4/22* (2013.01); *H04W 4/006* (2013.01); *H04W 4/026* (2013.01)

(58) Field of Classification Search
CPC ....... H04W 4/22; H04W 4/026; H04W 4/006; H04W 4/021; H04W 4/023; G08B 25/10
USPC .............. 455/456.5, 456.6, 457, 456.3, 456.1
See application file for complete search history.

(56) References Cited

U.S. PATENT DOCUMENTS

| | | | |
|---|---|---|---|
| 6,529,723 B1 | 3/2003 | Bentley | |
| 6,591,094 B1 | 7/2003 | Bentley | |

(Continued)

FOREIGN PATENT DOCUMENTS

| | | |
|---|---|---|
| EP | 1909069 | 4/2008 |
| WO | 2006081816 | 8/2006 |

OTHER PUBLICATIONS

English abstract and English machine translation of the specification and claims for WO 2006081816. Aug. 10, 2006.

*Primary Examiner* — Khai M Nguyen
(74) *Attorney, Agent, or Firm* — Holland & Hart LLP

(57) ABSTRACT

A method for geo-location services is described. In one embodiment, the method includes monitoring, via a sensor, a location of a service provider in relation to a predetermined location and receiving a request for a current status of the service provider. The current status includes a current location of the service provider and a current job-related status of the service provider. Upon determining the current status of the service provider, a notification including the current status of the service provider is generated.

20 Claims, 12 Drawing Sheets

(51) Int. Cl.
*H04W 4/22* (2009.01)
*H04W 4/00* (2009.01)

(56) References Cited

U.S. PATENT DOCUMENTS

| | | | |
|---|---|---|---|
| 7,847,686 B1 | 12/2010 | Atkins et al. | |
| 7,869,941 B2 * | 1/2011 | Coughlin | G01C 21/20 701/300 |
| 8,165,792 B2 | 4/2012 | Mikan et al. | |
| 8,456,293 B1 | 6/2013 | Trundle et al. | |
| 8,525,665 B1 | 9/2013 | Trundle et al. | |
| 8,712,810 B2 | 4/2014 | Meisels et al. | |
| 8,849,689 B1 | 9/2014 | Jagannathan et al. | |
| 2001/0030664 A1 | 10/2001 | Shulman et al. | |
| 2003/0004776 A1 | 1/2003 | Perrella et al. | |
| 2003/0060979 A1 | 3/2003 | Andrews et al. | |
| 2003/0154399 A1 | 8/2003 | Zuk et al. | |
| 2006/0142880 A1 | 6/2006 | Deen et al. | |
| 2006/0218244 A1 | 9/2006 | Rasmussen et al. | |
| 2007/0216535 A1 | 9/2007 | Carrino | |
| 2007/0229350 A1 | 10/2007 | Scalisi et al. | |
| 2007/0233582 A1 | 10/2007 | Abhyanker | |
| 2007/0298772 A1 | 12/2007 | Owens et al. | |
| 2008/0180240 A1 | 7/2008 | Raji et al. | |
| 2008/0195312 A1 | 8/2008 | Aaron et al. | |
| 2008/0242319 A1 | 10/2008 | Paschetto et al. | |
| 2010/0228473 A1 | 9/2010 | Ranford | |
| 2010/0281312 A1 | 11/2010 | Cohn et al. | |
| 2011/0046920 A1 | 2/2011 | Amis | |
| 2011/0088003 A1 * | 4/2011 | Swink et al. | 715/863 |
| 2012/0200711 A1 | 8/2012 | Dolin | |
| 2012/0309364 A1 | 12/2012 | Quady | |
| 2012/0317615 A1 | 12/2012 | Geva et al. | |
| 2012/0330710 A1 * | 12/2012 | Hauser | G06Q 10/10 705/7.15 |
| 2013/0049954 A1 | 2/2013 | Scannell | |
| 2013/0096813 A1 | 4/2013 | Geffner et al. | |
| 2013/0109404 A1 | 5/2013 | Husney | |
| 2013/0149986 A1 | 6/2013 | You | |
| 2013/0183924 A1 | 7/2013 | Saigh et al. | |
| 2013/0210464 A1 * | 8/2013 | Mittal | H04L 67/18 455/456.5 |
| 2013/0231864 A1 | 9/2013 | Stahl et al. | |
| 2013/0329527 A1 | 12/2013 | Alavala et al. | |
| 2014/0032433 A1 | 1/2014 | Erick et al. | |
| 2014/0039839 A1 * | 2/2014 | Yuen | G06K 9/22 702/189 |
| 2014/0164043 A1 | 6/2014 | Jordan | |
| 2014/0180710 A1 * | 6/2014 | Mitchley | G06F 19/3481 705/2 |
| 2014/0207375 A1 | 7/2014 | Lerenc | |
| 2014/0229099 A1 | 8/2014 | Garrett et al. | |
| 2014/0330904 A1 | 11/2014 | Jackson et al. | |
| 2015/0025790 A1 * | 1/2015 | Hwang | G08B 25/10 701/411 |

* cited by examiner

GEO-LOCATION SERVICES

CROSS REFERENCES

The present Application claims priority to U.S. Provisional Patent Application No. 61/847,426, titled: "SYSTEMS AND METHODS FOR GEO-LOCATION SERVICES", filed on Jul. 17, 2013.

BACKGROUND

Advancements in media delivery systems and media-related technologies continue to increase at a rapid pace. Increasing demand for media has influenced the advances made to media-related technologies. Computer systems have increasingly become an integral part of the media-related technologies. Computer systems may be used to carry out several media-related functions. The widespread access to media has been accelerated by the increased use of computer networks, including the Internet and cloud networking.

Many businesses use one or more computer networks to deliver media between the various computers connected to the networks. Users of computer technologies continue to demand increased access to media and an increase in the efficiency of these technologies. Improving the efficiency of computer technologies is desirable to those who use and rely on computers.

With the widespread use of computers and mobile devices has come an increased presence of home automation and home security products. Advancements in mobile devices allow users to track a location of a device and/or a person carrying the device. Such geo-location information, however, is not always readily available. As a result, benefits may be realized by providing systems and methods for geo-location services in relation to home automation systems.

SUMMARY

According to at least one embodiment, a method for geo-location services is described. In one embodiment, the method may include monitoring, via a sensor, a location of a service provider in relation to a predetermined location and receiving a request for a current status of the service provider. The current status may include a current location of the service provider and a current job-related status of the service provider. The current job-related status may include at least one of traveling to a job, on a job, on break, and off work. Upon determining the current status of the service provider, a notification including the current status of the service provider may be generated.

In some embodiments, the method may include calculating an estimated time of arrival of the service provider to the predetermined location based on any combination of the current location of the service provider and the current job-related status of the service provider. In some cases, the method may include pausing a channel from subscriber program content and displaying the notification on at least a portion of the paused channel.

In one embodiment, the method may include learning a route of the service provider in relation to the predetermined location. Upon learning the route of the service provider, an estimated time of arrival of the service provider to the predetermined location may be calculated based on the current location of the service provider in relation to the learned route. Upon determining the service provider is deviating from the learned route, a notification may be generated.

In one embodiment, the method may include determining a number of remaining appointments of the service provider before an appointment to the predetermined location. An estimated time of arrival of the service provider to the predetermined location may be calculated based on the number of remaining appointments of the service provider.

A computing device configured for geo-location services is also described. The computing device may include a processor and memory in electronic communication with the processor. The memory may store computer executable instructions that when executed by the processor cause the processor to perform the steps of monitoring, via a sensor, a location of a service provider in relation to a predetermined location, receiving a request for a current status of the service provider, and upon determining the current status of the service provider, generating a notification comprising the current status of the service provider. The current status may include a current location of the service provider and a current job-related status of the service provider.

A non-transitory computer-readable storage medium storing computer executable instructions is also described. When the instructions are executed by a processor, the execution of the instructions may cause the processor to perform the steps of monitoring, via a sensor, a location of a service provider in relation to a predetermined location, receiving a request for a current status of the service provider, and upon determining the current status of the service provider, generating a notification comprising the current status of the service provider. The current status may include a current location of the service provider and a current job-related status of the service provider.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
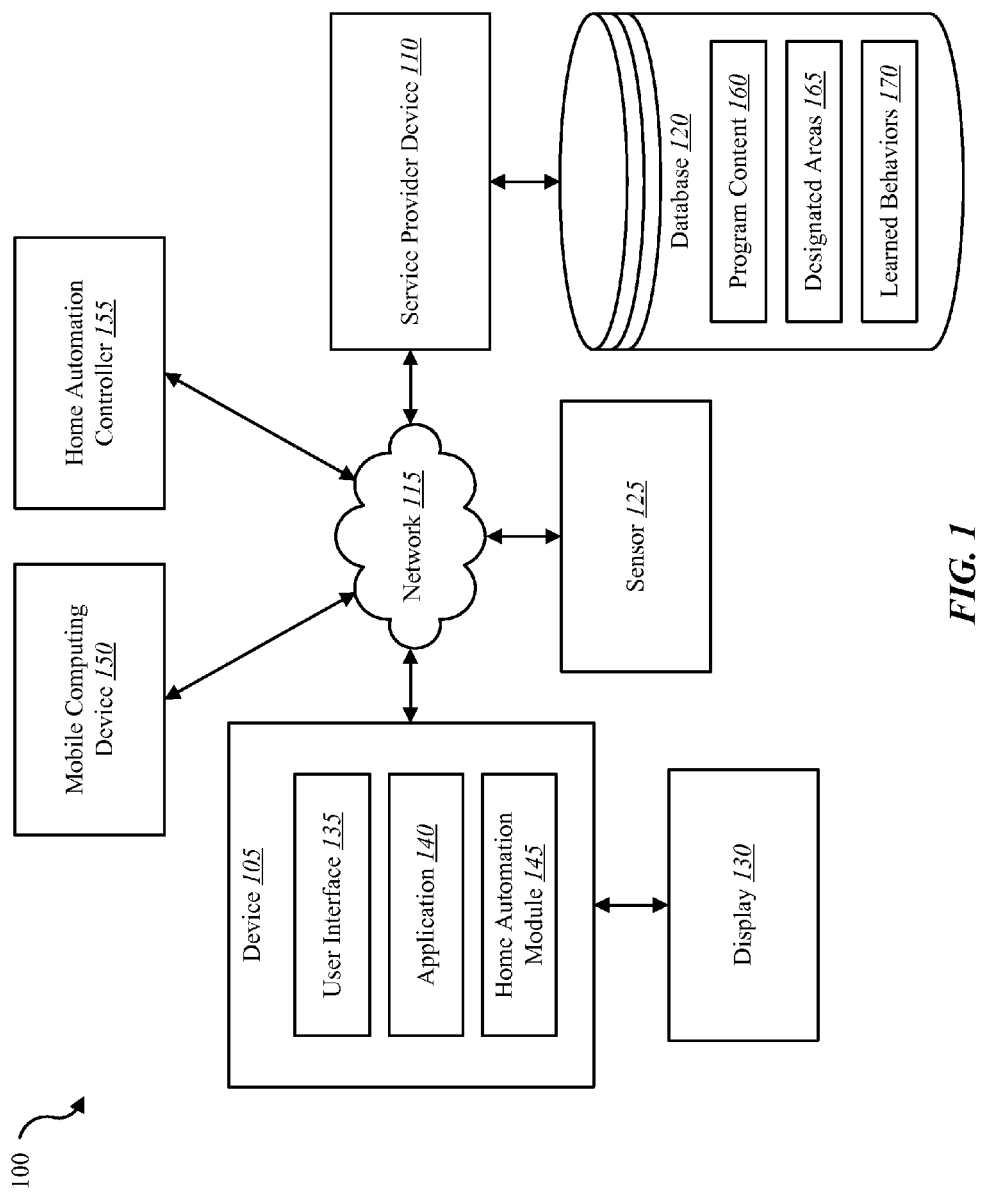
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The systems and methods described herein relate to home automation. More specifically, the systems and methods described herein relate to geo-location services in relation to a home automation system. Some embodiments of the systems and methods described herein relate to geo-location services in relation to an integration of home automation and a subscriber-based media content set top box, such as a satellite and/or cable digital video recorder (DVR).

In one example, a user may desire to receive an alert when another user leaves a certain area. For instance, the parent of a child may want to know when the child is outside the home. Presently, the parent may place a tracking device on the child. The parent, however, may have to actively check a monitoring device to know whether the child has wandered outside of the home. The present systems and methods provide the means for tracking a certain user, detecting when the certain user passes through a predetermined perimeter, and providing notification messages upon detecting the user passing through the predetermined perimeter. Moreover, the systems and methods described herein may provide geo-location services and notifications in relation to a home automation system. Furthermore, the systems and methods described herein may provide geo-location services and notifications in relation to a channel of a subscriber-based media content set top box.

FIG. 1 is a block diagram illustrating one embodiment of an environment 100 in which the present systems and methods may be implemented. In some embodiments, the systems and methods described herein may be performed on a device (e.g., device 105). The environment 100 may include a device 105, service provider device 110, a sensor 125, a display 130, a mobile computing device 150, a home automation controller 155, and a network 115 that allows the device 105, the service provider device 110, the mobile computing device 150, home automation controller 155, and sensor 125 to communicate with one another. Examples of the device 105 include media content set top box, satellite set top box, cable set top box, DVRs, personal video recorders (PVRs), mobile devices, smart phones, personal computing devices, computers, servers, etc. Examples of the home automation controller 155 include a dedicated home automation computing device (e.g., wall-mounted controller), a personal computing device (e.g., laptop, desktop, etc.), a mobile computing device (e.g., tablet computing device, smartphone, etc.), and the like. Examples of sensor 125 include a camera sensor, audio sensor, three-dimensional (3-D) sensor, motion sensor, smoke sensor, glass break sensor, door sensor, window sensor, carbon monoxide sensor, accelerometer a location sensor (e.g., global positioning system (GPS) sensor, Wi-Fi positioning system sensor, etc.), capacitance sensor, radio frequency sensor, near-field sensor, temperature sensor, heartbeat sensor, breathing sensor, oxygen sensor, carbon dioxide sensor, brain wave sensor, movement sensor, voice sensor, and the like. Sensor 125 may represent one or more of the sensors listed or a combination thereof. For example, sensor 125 may represent one or more camera sensors and one or more motion sensors connected to the environment 100. Additionally, or alternatively, sensor 125 may represent a combination sensor such as both a camera sensor and a motion sensor integrated in the same device. Sensor 125 may be integrated with a facial recognition system. Although sensor 125 is depicted as connecting to device 105 over network 115, in some embodiments, sensor 125 may connect directly to device 105. Additionally, or alternatively, sensor 125 may be integrated with a home appliance or fixture such as a light bulb fixture.

In some configurations, the device 105 may include a user interface 135, application 140, and home automation module 145. Although the components of the device 105 are depicted as being internal to the device 105, it is understood that one or more of the components may be external to the device 105 and connect to device 105 through wired and/or wireless connections. In some embodiments, application 140 may be installed on mobile computing device 150 in order to allow a user to interface with a function of device 105, home automation module 145, home automation controller 155, and/or service provider device 110.

In some embodiments, device 105 may communicate with service provider device 110 via network 115. Example of networks 115 include cloud networks, local area networks (LAN), wide area networks (WAN), virtual private networks (VPN), wireless networks (using 802.11, for example), cellular networks (using 3G and/or LTE, for example), etc. In some configurations, the network 115 may include the internet. It is noted that in some embodiments, the device 105 may not include a home automation module 145. For example, the device 105 may include the application 140 that allows the device 105 to interface with the home automation controller 155 via the home automation module 145 located on another device such as mobile computing device 150 and/or service provider device 110. In some embodiments, device 105, home automation controller 155, and service provider device 110 may include a home automation module 145 where at least a portion of the functions of home automation module 145 are performed separately and/or concurrently on device 105, home automation controller 155, and/or service provider device 110. Likewise, in some embodiments, a user may access the functions of device 105 and/or home automation controller 155 (directly or through device 105 via home automation module 145) from mobile computing device 150. For example, in some embodiments, mobile computing device 150 includes a mobile application that interfaces with one or more functions of device 105, home automation controller 155, home automation module 145, and/or service provider device 110.

In some embodiments, service provider device 110 may be coupled to database 120. Database 120 may include program content 160, designated areas 165, and learned behaviors 170. For example, device 105 may access program content 160 in database 120 over network 115 via service provider device 110. Database 120 may be internal or external to the service provider device 110. In one example, device 105 may be coupled directly to database 120, database 120 being internal or external to device 105.

Home automation module 145 may allow a user to control (either directly or via home automation controller 155), from a subscription-content media set top box, an aspect of the home of the user, including security, locking or unlocking a door, checking the status of a door, locating a person or item, controlling lighting, thermostat, cameras, and the like. In some configurations, application 140 may enable device 105 to interface with home automation controller 155 via home automation module 145 to provide home automation content to device 105 and/or mobile computing device 150. Thus, application 140, via the home automation module 145, may allow users to control aspects of their home. Further details regarding the home automation module 145 are discussed below.

Figure 2:
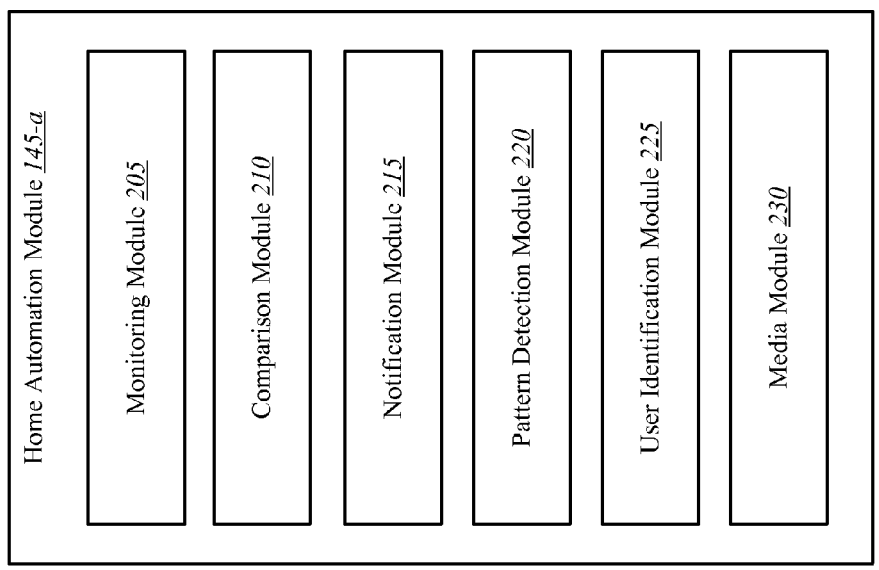
FIG. 2 is a block diagram illustrating one example of a home automation module.

FIG. 2 is a block diagram illustrating one example of a home automation module 145-*a*. Home automation module 145-*a* may be one example of home automation module 145 depicted in FIG. 1. As depicted, home automation module 145-*a* may include monitoring module 205, comparison module 210, notification module 215, pattern detection module 220, a user identification module 225, and a media module 230.

In some embodiments, service provider device 110 may provide subscriber program content (cable/satellite television programming, for example) to a user via a set top box located in a home, office, etc. of the user. Examples of set top boxes include cable set top boxes, satellite set top boxes, DVRs, PVRs, and the like. Monitoring module 205 may be configured to monitor a location of a user, object, etc. In some embodiments, monitoring module 205 may monitor a status of an object, such as a security camera, a door lock, a door status, a smoke alarm (or other type of sensor), a home appliance, utility equipment, energy/utility usage, and the like. Home appliances may include a refrigerator, oven, microwave oven, stove, dishwasher, washer, dryer, and the like. Utility equipment may include a garage door opening system, heating ventilation air conditioning (HVAC) equipment, culinary water equipment (water heater, water softener, water meter, fire alarm, in-home sprinkler system, etc.), telephony equipment, irrigation water equipment (lawn sprinkler system, etc.), natural gas system (carbon monoxide sensor, gas meter, gas detection system, etc.), and the like. Monitoring module 205 may be configured to detect a predetermined change related to an object or the triggering of a predetermined threshold related to the object (carbon monoxide levels exceed a certain level, for example). In one embodiment, monitoring module 205 monitors a location of a user or object in relation to a predetermined condition. The predetermined condition may include a user and/or object entering or leaving a predetermined boundary, such as, entering and/or leaving a room of a home or any sort of building. The predetermined condition may further include detecting a user performing an action and/or a sequence of actions, detecting a routine that a user performs, detecting a user falling, detecting a user approaching or being at a predetermined location, detecting when a user deviates from a route the user routinely takes, tracking a location and/or status of a service provider scheduled to arrive at a user's home or office, tracking a user's location in relation to a calendar appointment, tracking one or more conditions associated with a route a user may take to an appointment, tracking certain incidents and related information (e.g., theft, burglary, type of items taken, day of the week incident occurred, time of day, etc.) within a geographic region in relation to a subscription service and providing the statistics of tracked incidents to subscribers located within the geographic area. The predetermined condition may further include providing temporary codes to emergency response personnel responding to an emergency situation (e.g., a user has fallen and is unable to unlock a door).

In one embodiment, notification module 215 may generate a notification in response to detecting one of the predetermined conditions listed above. In some embodiments, notification module 215, in conjunction with the user interface 135, may display a notification on a display connected to a set top box. Notification module 215 may display the notification in relation to a presently viewed channel of the subscriber program content. In some cases, notification module 215 may display the notification in at least a portion of a viewing area of the channel. For example, a user watching content from a satellite DVR on a television may receive a notification displayed on at least a portion of the screen of the television. For example, a notification relating to a child leaving a house located in a certain community may be generated and sent to each user within the community that subscribes to set-top box service. The notification may be displayed on each television attached to the set-top box in the community that subscribes to the service.

In some embodiments, notification module 215 may adapt a notification based on certain conditions. Notification module 215 may determine whether to display a notification on a display based on notification rules associated with a current state of device 105. For example, notification 215 may determine whether to display the notification based on the content provided by a set top box that a user is currently viewing. For instance, if a user is watching a sports (e.g., boxing match, World Series, Superbowl, etc.) notification 215 may block the display from being displayed or route the notification to another device, such as an email or a text message sent to a smartphone or tablet device. In some cases, notification module 215 may alter the notification based on the current state of the device 105. For one type of programming and set top box content, notification module 215 may show scrolling text across an edge of the television screen. For another type of programming, notification module 215 may play a sound (e.g., a tone, a combination of tones, a recorded voice notification, a text to speech notification, and the like) based on the type of notification. In some embodiments, notification module 215 may alter the destination of the notification based on the type of notification and/or the type of programming currently being viewed by the user. For example, if the notification rules require minimum notification for a certain type of programming, the notification module 215 may display in alternative modes of communication. For instance, notification module 215 may email or text message a notification to a user based on the type of notification, the type of programming the user is currently watching, whether programming is currently being watched, and/or the current location of the user, etc.

In some cases, notification 215 may determine whether to display a notification in relation to programming currently being watched by the user and how to handle the programming based on the type of notification and/or the type of programming. For example, home automation module 145-*a* may pause the programming for one type of notification, show a pop up message for another type of notification without pausing the programming, split the screen between a window for a security camera view and a window for the programming for another type of notification, and so forth. Additionally, or alternatively, notification module 215 may pause the programming for one type of notification based on one type of programming, block the notification for the same type of notification based on another type of programming, and continue showing the programming for the same type of notification based on a third type of programming.

In some embodiments, upon detecting a predetermined change related to a location of a user or a status of an object, media module 230 may pause subscriber program content currently provided on a channel. For example, the home automation module 145-a may pause and/or record a portion of the content the user was viewing when the notification is displayed. In some cases, the notification may include a picture in picture notification, a text bar, scrolling text, a pop up, or drop down notification message. In some cases, the presently viewed channel may be paused upon the notification module 215 displaying the notification.

In one embodiment, the monitoring module 205 may monitor a location of a user within a home or building, a user outside a home or office, or the location of a service provider. In some embodiments, pattern detection module 220 may be configured to learn and subsequently identify a pattern associated with the monitored action of the user. Comparison module 210 may compare an initiated pattern of the user to a learned pattern of the user. Upon determining a match, comparison module 210 may trigger pattern detection module 220 to perform an operation.

The pattern detection module 220 may identify a pattern associated with a particular user in conjunction with user identification module 225. In some embodiments, user identification module 225 may identify a user via sensor 125. For example, user identification module 225 may identify a user using facial recognition, identify a device associated with the user, identify an identification code that is transmitted from a device associated with the user, identify a movement signature of the user, identify a voice of the user, and the like.

In some embodiments, pattern detection module 220 may detect an initiation of the identified pattern associated with the monitored action and location of the user. Upon detecting the initiation of the identified pattern, home automation module 145-a may perform an action or a sequence of actions. For example, pattern detection module 220 may detect that a certain user dims the lights to a certain level, watches a certain program at certain times each week, and routinely turns off the dishwasher when it is running during the certain times. Upon recognizing an initiation of the learned pattern based on the user's location at a certain time of day, home automation module 145 may automatically turn on the television, tune a satellite and/or cable set top box to a particular channel, dim the lights to a predetermined level, and pause the dishwasher cycle, if home automation module 145-a detects the dishwasher is currently running. Upon detecting the end period of the satellite content, home automation module 145-a may resume the dishwasher cycle, increase the brightness of the lights, etc.

In one embodiment, media module 230 may provide subscriber program content to a user via a set top box located in a home of the user. Monitoring module 205 may monitor an aspect of the home of the user. Media module 230, in conjunction with the user interface 135, may provide a monitor channel to display the monitored aspect of the home to the user. The monitor channel may be displayed in a channel guide among channels of the subscriber program content. For example, a subscription to cable or satellite media content may include a channel guide that includes a list of selectable channels and their respective content. Among the list of channels provided by subscription, home automation module 145-a may append one or more home automation channels that are selectable and interact with user commands in a similar manner as the subscription channels in the channel guide.

Media module 230 may provide a tracking channel, similar to the monitor channel described above, to display a map of tracked users and/or objects among channels of the subscriber program content. In some embodiments, home automation module 145-a may provide a home automation preview channel. The home automation preview channel may provide a real-time preview of two or more home automation channels. In some embodiments, home automation module 145-a may split the screen to show the current content provided by a media provider and a location of a user being tracked. Alternatively, home automation module 145-a may display the location of the user being tracked in a picture in picture element over the current channel.

Figure 3:
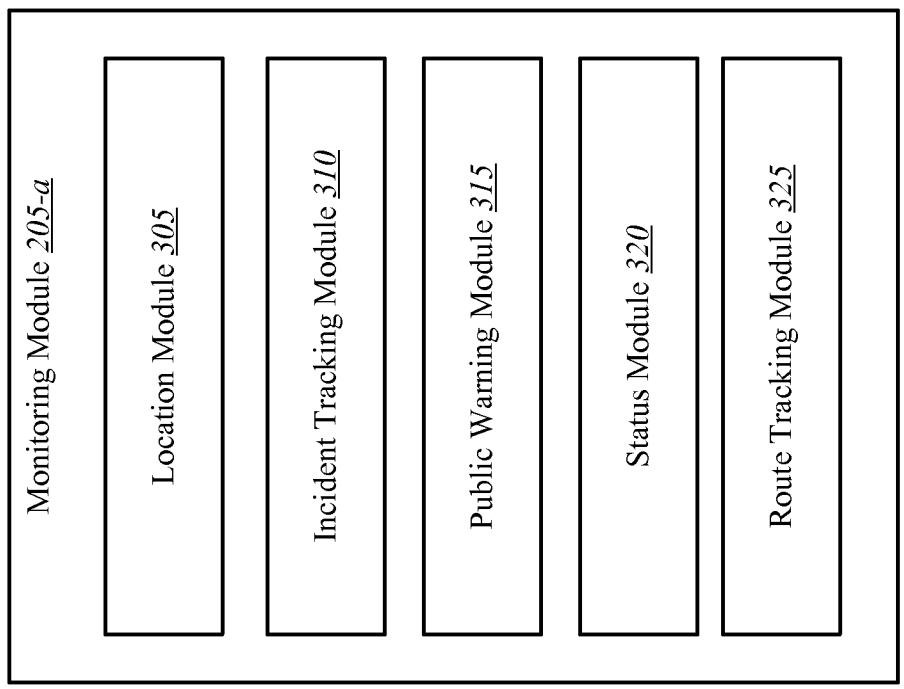
FIG. 3 is a block diagram illustrating one example of a monitoring module from the home automation module.

FIG. 3 is a block diagram illustrating one example of a monitoring module from the home automation module 205-a. Monitoring module 205-a may be one example of monitoring module 205 depicted in FIG. 2. As depicted, monitoring module 205-a may include location module 305, incident tracking module 310, public warning module 315, status module 320, and route tracking module 325.

In one embodiment, location module 305 may track the location of an entity (e.g., family members, pets, and objects) in certain locations such as at home or at the office, and generally in any area. In one case, when a tracked entity passes through or breaches a predetermined boundary, a notification may be generated. A warning message may be provided to a contact on a contact list. The contact list may include family members, neighbors, as well as law enforcement and emergency response personnel. In one embodiment, notification module 215 may generate a community notification message and send an alert to contacts on a community contact list. In some cases, the community contact list may include users that have a similar system and subscribe to a similar service within a certain community area. Contacts on the community contact list may also include email, text messaging, and telephone number contacts of people within the community area.

In one embodiment, location module 305 may track the location of a user and/or object. The system may monitor the behavior of a user in a certain location. In some cases, monitoring module 205-a, in conjunction with user identification module 225, may identify a motion signature of a user detected through video sensors and/or sensors on the person (e.g., accelerometer), the motion signature including a certain motion or sequence of motions that uniquely identifies the user. Thus, monitoring module 205-a may identify the user based on the detected motion of the user. Additionally, or alternatively, monitoring module 205-a may identify the user using a facial recognition algorithm. In one embodiment, pattern detection module 220 may learn a behavior of the user based on detecting the identity of the user and monitoring the actions of the user. Pattern detection module 220 may track when the actions are performed, where the actions are performed, and a pattern of related actions the user performs, etc. Monitoring module 205-a may detect the difference between a user "leaving" and "entering" a room, and respond accordingly. Home automation module 145 may anticipate the actions of the user by comparing a learned behavior/pattern of the user to a currently detected action or sequence of actions of the user. For example, monitoring module 205-a may monitor the location, identity, and current actions of a user. Comparison module 210 may compare the current actions of the identified user to a database of learned behaviors (e.g., learned behaviors 170). Upon detecting a match, home automation module 145 may perform an operation (e.g., execute a command, activate a device) in response to a match between the detected action of the user and a learned behavior of the user. For example, the system may turn on a light, turn off a light, adjust a thermostat, turn on/off television programming or otherwise adjust the television programming (e.g., pause, rewind, fast forward, stop, record, play, switch to another channel, switch from one form of media to a different form of media, etc.).

In some embodiments, monitoring module 205-a may monitor a sensor on a person (e.g., sensor 125). Monitoring module 205-a, via the sensor, may detect when a user falls. Additionally, monitoring module 205-a may monitor a sensor that tracks a current condition of the user, including temperature (body temperature), heartbeat, breathing, brain waves, movement, voice, sound, etc. Thus, monitoring module 205-a may differentiate between a person falling while wearing the sensor and false alarms such as where a person merely drops the sensor or activities such as a user playing a sport or exercising. Notification module 215 may generate a notification in response to the detection of the fall. In some cases, a notification may be sent through home automation controller 155. Upon being alerted, a receiver of the notification may attempt to contact the user to verify that the user did fall, whether the user is able to get up, whether the person is alone at the location, and whether the person is conscious. In some cases, notification module 215 may send a notification to emergency response personnel. Additionally, or alternatively, notification module 215 may send a notification to one or more persons on a contact list. In one embodiment, location module 305 may determine the location of one or more users on the contact list and contact a user that is currently closest to the fallen person's location. In some cases, notification module 215 may contact a person on the contact list based on the default location of persons on the contact list. In some embodiments, the notification may include a summary of what happened (e.g., person has fallen, is injured, etc.), a current status of the fallen person, that emergency response personnel have been contacted and/or their current status and estimated time of arrival (ETA), vital signs of the injured person, whether they are stable, conscious, etc. In some cases, monitoring module 205-a may provide this information to a monitoring service and the monitoring service may contact a person on the contact list and relay this information over the phone, email, SMS, etc. In one embodiment, the fallen person's symptoms may be tracked by the monitoring module 205-a in conjunction with one or more sensors. Monitoring module 205-a may communicate the symptoms to emergency response personnel currently in route to the fallen person's location, providing diagnostic information before the emergency response personnel arrive at the location, resulting in saved time for the emergency response personnel, the saved time being used in treating the fallen person instead of diagnosing injuries.

In some embodiments, a door lock may be linked to the system. The door lock may include a keypad, wireless transceiver, and/or a camera. In one example, monitoring module 205-a may recognize a user using a camera and performing a facial recognition algorithm. Upon recognizing the user, the home automation module 145 may unlock the door. Monitoring module 205-a may detect a signal from a mobile computing system carried by a user (e.g., smartphone, etc.) and in response to receiving and verifying an unlocking code in the received signal, home automation module 145 may unlock the door. In some cases, monitoring module 205-a may receive an input from the user (e.g., biometric scan, code entered in a keypad, etc.) and unlock the door in response to a verified input. In some cases, when emergency response personnel respond to emergencies at homes and locations where no one is available to unlock a door, the emergency response personnel have little choice but to break in the door, resulting in potentially thousands of dollars of damage. To remedy this costly situation, notification module 215 may send a temporary code to emergency response personnel when responding to a detected emergency. For example, upon detecting a fall of a person that is home alone and is injured or unable to get up, notification module 215 may provide a temporary code to the emergency response personnel to allow them to open a locked door. The code may be manually entered on a door lock that includes a keypad (e.g., front door or garage door with a keypad). Additionally, or alternatively, the code may be a digital code received wirelessly. The code may be encrypted and received in an application installed on a mobile device in the possession of emergency response personnel. The code may then be relayed to the door lock wirelessly via the mobile device (e.g., code wirelessly transmitted via a mobile computing device). The code may unlock a house door and/or a garage door. In some cases, the system may track the location of emergency response personnel. In one embodiment, monitoring module 205-a may monitor the location of emergency response personnel. Upon detecting the emergency response personnel arriving at the location of the fallen person, the home automation module 145 may unlock the locked door and/or open a garage door, etc.

In one embodiment, incident tracking module 310 may track community incidents (theft, burglary, vandalism, etc.). Incident tracking module 310 may track incidents in association with a subscription service. Incident tracking module 310 may track incidents within the community and provide information related to the tracked incidents to subscribers of the subscription service that are located in the community in which the incidents occurred. Incident tracking module 310 may mask the identity of persons and/or locations associated with the incidents. Thus, incident tracking module 310 may provide information such as type of items stolen, point of entry, time of entry, day of the week incident occurred, etc. In some cases, media module 330 may provide incident reports on a dedicated channel of a channel guide among channels of subscriber program content.

In one embodiment, when a user approaches or is located in an area that is designated as a dangerous area (e.g., designated areas 165), notification module 215 may send an alert to the tracked user and/or one or more other users. The designated area may be manually configured to include those areas known or suspected to be dangerous (e.g., abandoned building, construction site, busy streets, etc.). Additionally, or alternatively, public warning module 315 may track locations of temporary dangerous conditions (e.g., severe weather such as tornados and earthquakes, escaped inmates, manhunts, etc.). In some cases, notification module 215 may switch a current channel being watched by a family member at home to a dedicated map/tracking channel, indicating the tracked user's current location. In some cases, a notification message may be displayed on the television screen. The system may send an alert to the user traveling towards a detected or designated dangerous area. The system may also provide an alert to a family member by switching a channel to a dedicated tracking channel and/or by sending an email, text message, voicemail, etc. In some embodiments, pattern detection module 220 may learn travel routines (e.g., route taken to school by child, route taken to work, to grocery store, etc.). Notification module 215 may generate a notification when it detects a deviation from a learned route. For example, when a child deviates from a route the child usually taken to school, notification module 215 may generate an alert and provide the alert to a parent, etc.

In some embodiments, a service provider may be tracked involving a delivery (e.g., USPS, UPS, FedEx, etc.), a media provider (e.g., satellite, cable, telephone), service repair technician, nursing staff, ambulance, police, and the like. Additionally, or alternatively, monitoring module 205-*a* may track a garbage collector, snow removal vehicles, etc. The tracking feature may be enabled manually (e.g., by invitation through text message, etc.) and/or enabled by company policy (e.g., tracking device located on company vehicle, tracking location of employee during business hours, etc.). Monitoring module 205-*a* may implement privacy controls that include non-specific location information, temporary tracking, tracking expiration, scheduled tracking based on business hours, and the like. For example, monitoring module 205-*a* may track only a certain degree of granularity, such as the name of a street or city where the service provider is currently located. In some embodiments, status module 320 may track a current status of the service provider (e.g., on the road, on a job, on break, at lunch, off work, etc.) and remaining appointments of the service provider. Notification module 215 may filter the information received from monitoring module 205-*a* and provide the filtered information to a customer waiting for the service provider to arrive. For example, monitoring module 205-*a* may determine the location of the service provider, that the status of the service provider is at lunch, and that the service provider has one appointment before the user's appointment. Home automation module 145 may calculate an estimated time of arrival based on the location, status, and remaining appointments. Notification module 215 may provide the estimated time of arrival to the user and/or information related to the location, status, and remaining appointments of the service provider.

In one embodiment, location module 305 may track locations of attendees of an appointment. In some cases, attendees may receive an invitation to accept temporary/limited tracking in relation to the appointment. In some cases, a company may enable a tracking policy to enable at least a limited form of tracking of employees during business hours. Monitoring module 205-*a* may send an attendee a message with a request to respond with the attendee's current location in order to provide notification to other attendees whether the tracked attendee is likely to make the appointment on time and/or to provide an ETA for the tracked attendee to the other attendees. For example, one attendee may be stuck in an airport in a different city. The system may determine that a flight from this user's current location will take longer than the time left before the meeting starts. Accordingly, the system may provide notification to the other attendees that the tracked user will likely be unable to attend the meeting on time. In some cases, in order to protect privacy, the system may not provide the location of the tracked entity, but instead, may simply provide information based on the tracked location. For example, monitoring module 205-*a* may receive the location of the user, but instead of providing the location of the tracked user, monitoring module 205-*a* may simply provide notification that the tracked user is 10 minutes away. In some cases, a device on the user may estimate how far the user is and send this information (e.g., user is 10 minutes away, user is 10 miles from location, etc.).

Based on the user's current location home automation module 145 may determine a suggested route (e.g., fastest or shortest route) to a user's appointment. In some cases, route tracking module 325 may track conditions related to the suggested route. For example, route tracking module 325 may track conditions related to the suggested route (e.g., weather conditions, flight delays, traffic accidents, road closures, etc.). In one example, the user may be watching television programming. Upon detecting a change in conditions related to the suggested route, notification module 215 may generate a notification. In one case, notification module 215 may display a message on the television screen, send a text message, send an email, etc. Home automation module 145 may switch to an appointments channel and provide estimated travel time based on the detected changes to the suggested route. For example, if route tracking module 325 detects a traffic accident along the route to an appointment, notification module 215 may alert the user that the estimated travel time has increased and may provide an updated suggested departure time and/or an updated route.

Figure 4:
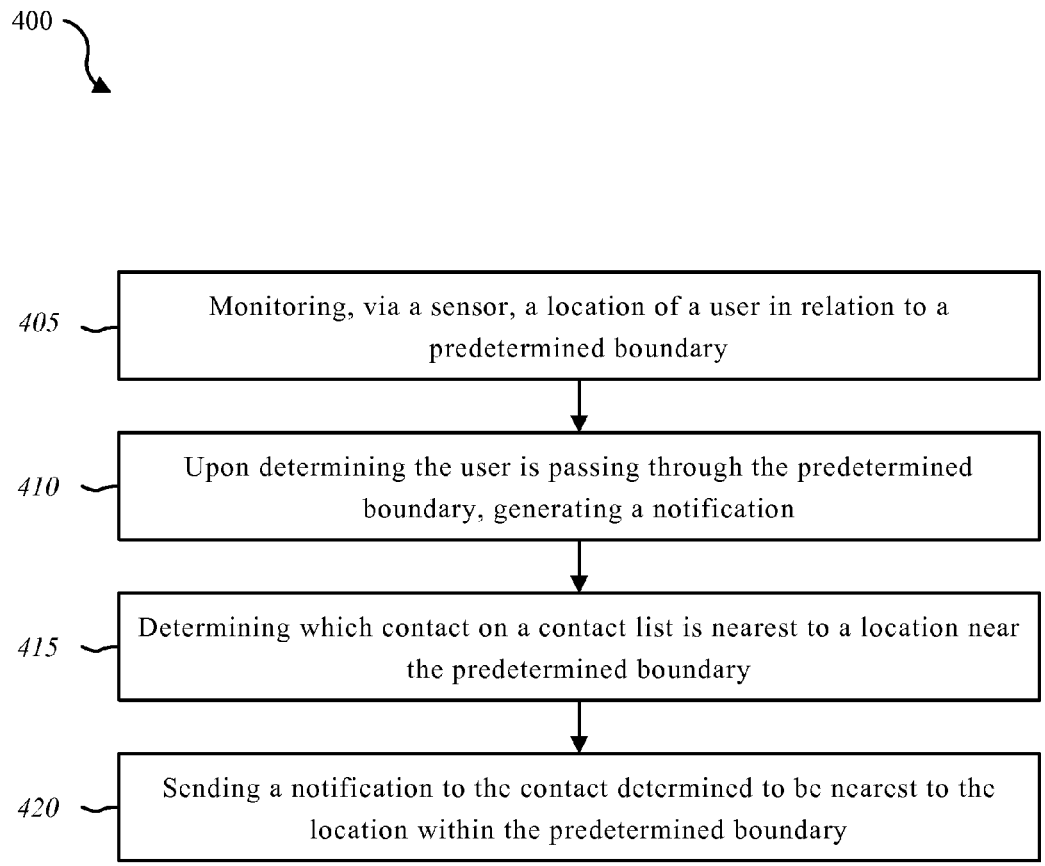
FIG. 4 is a flow diagram illustrating one embodiment of a method for generating notification when a particular user passes through a predetermined boundary.

FIG. 4 is a flow diagram illustrating one embodiment of a method 400 for generating notification when a particular user passes through a predetermined boundary. In some configurations, the method 400 may be implemented by the home automation module 145 illustrated in FIG. 1 or 2. In some configurations, the method 400 may be implemented in conjunction with the application 140 and/or the user interface 135 illustrated in FIG. 1.

At block 405, a location of a user may be monitored in relation to a predetermined boundary. At block 410, upon determining the user is passing through the predetermined boundary, a notification may be generated. At block 415, it may be determined which contact on a contact list is nearest to a location near the predetermined boundary. At block 420, a notification may be sent to the contact determined to be nearest to the location within the predetermined boundary.

Figure 5:
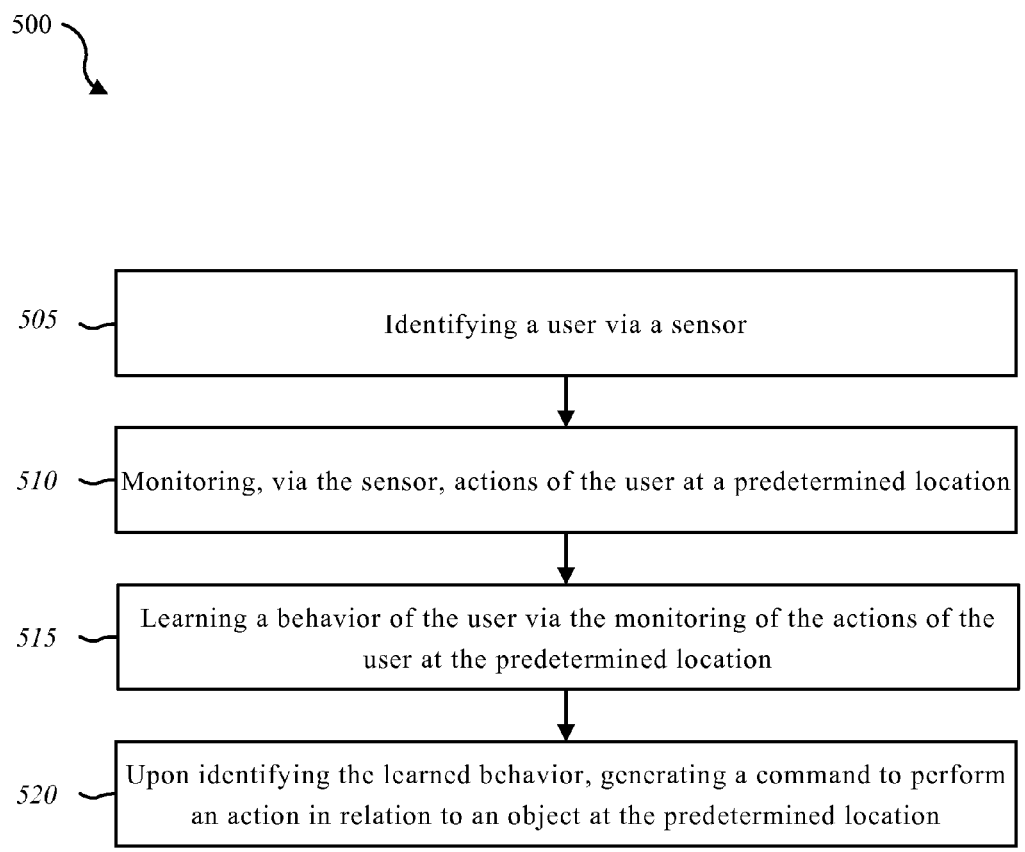
FIG. 5 is a flow diagram illustrating one embodiment of a method for performing an action upon identifying a learned behavior of the user.

FIG. 5 is a flow diagram illustrating one embodiment of a method 500 for performing an action upon identifying a learned behavior of the user. In some configurations, the method 500 may be implemented by the home automation module 145 illustrated in FIG. 1 or 2. In some configurations, the method 800 may be implemented in conjunction with the application 140 and/or the user interface 135 illustrated in FIG. 1.

At block 505, a user may be identified via a sensor. At block 510, actions of the user may be monitored at a predetermined location. At block 515, a behavior of the user may be learned via the monitoring of the actions of the user at the predetermined location. At block 520, upon identifying the learned behavior, a command to perform an action in relation to an object at the predetermined location may be generated.

Figure 6:
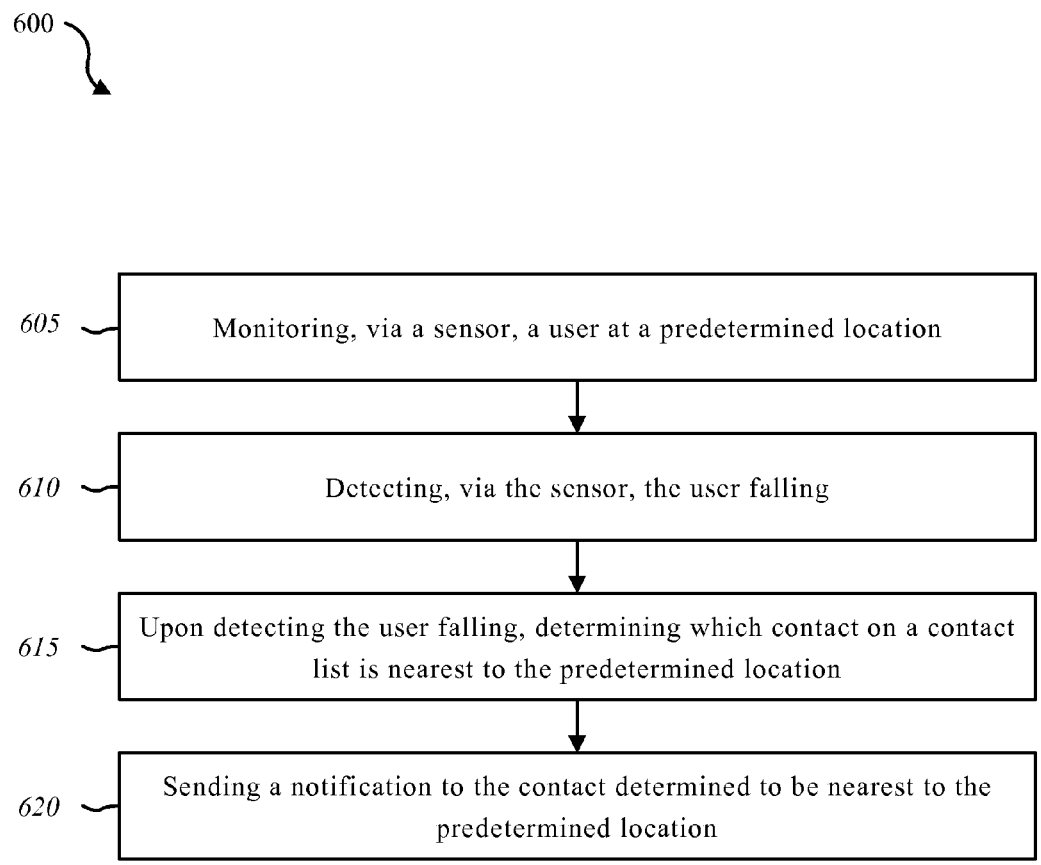
FIG. 6 is a flow diagram illustrating one embodiment of a method for generating a notification upon detecting a user falling.

FIG. 6 is a flow diagram illustrating one embodiment of a method 600 for generating a notification upon detecting a user falling. In some configurations, the method 600 may be implemented by the home automation module 145 illustrated in FIG. 1 or 2. In some configurations, the method 600 may be implemented in conjunction with the application 140 and/or the user interface 135 illustrated in FIG. 1.

At block 605, a user may be monitored at a predetermined location. At block 610, the user falling may be detected. At block 615, upon detecting the user falling, it may be determined which contact on a contact list is nearest to the predetermined location. At block 620, a notification may be sent to the contact determined to be nearest to the predetermined location.

Figure 7:
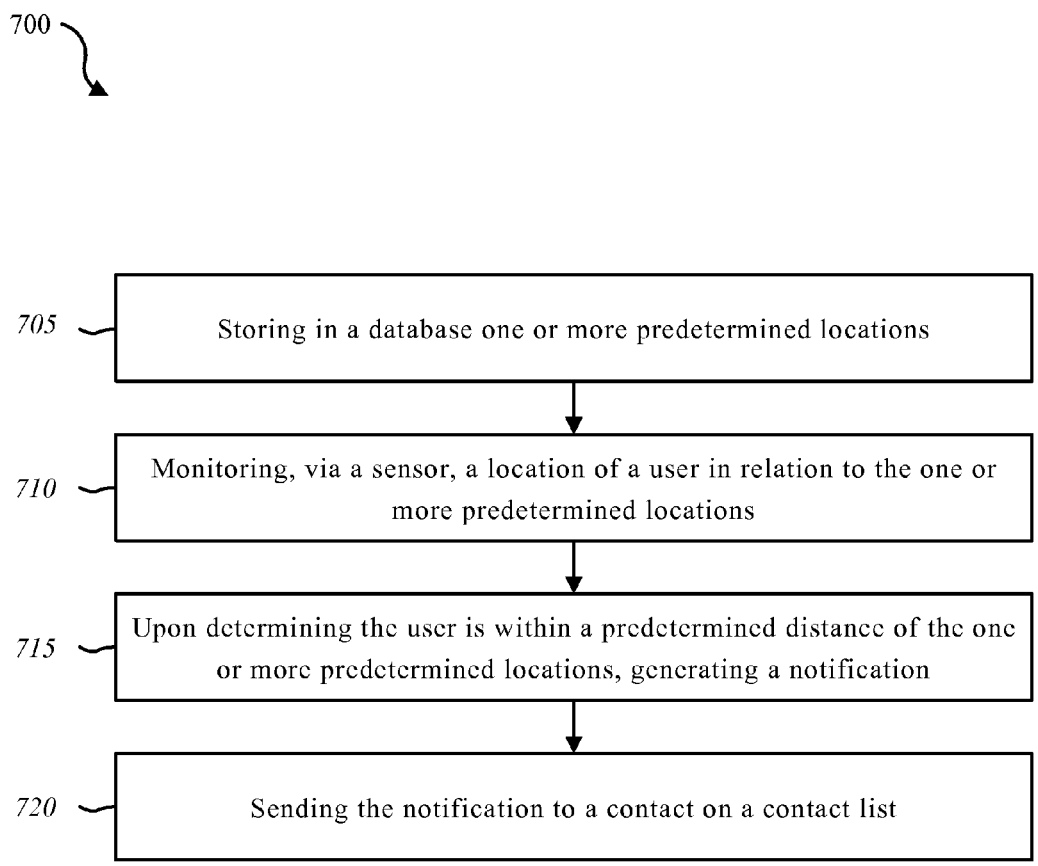
FIG. 7 is a flow diagram illustrating one embodiment of a method for generating a notification upon determining a user is near a predetermined location.

FIG. 7 is a flow diagram illustrating one embodiment of a method 700 for generating a notification upon determining a user is near a predetermined location. In some configurations, the method 700 may be implemented by the home automation module 145 illustrated in FIG. 1 or 2. In some configurations, the method 700 may be implemented in conjunction with the application 140 and/or the user interface 135 illustrated in FIG. 1.

At block 705, one or more predetermined locations may be stored in a database. At block 710, a location of a user may be monitored in relation to the one or more predetermined locations. At block 715, upon determining the user is within a predetermined distance of the one or more predetermined locations, a notification may be generated. At block 720, the notification may be sent to a contact on a contact list.

Figure 8:
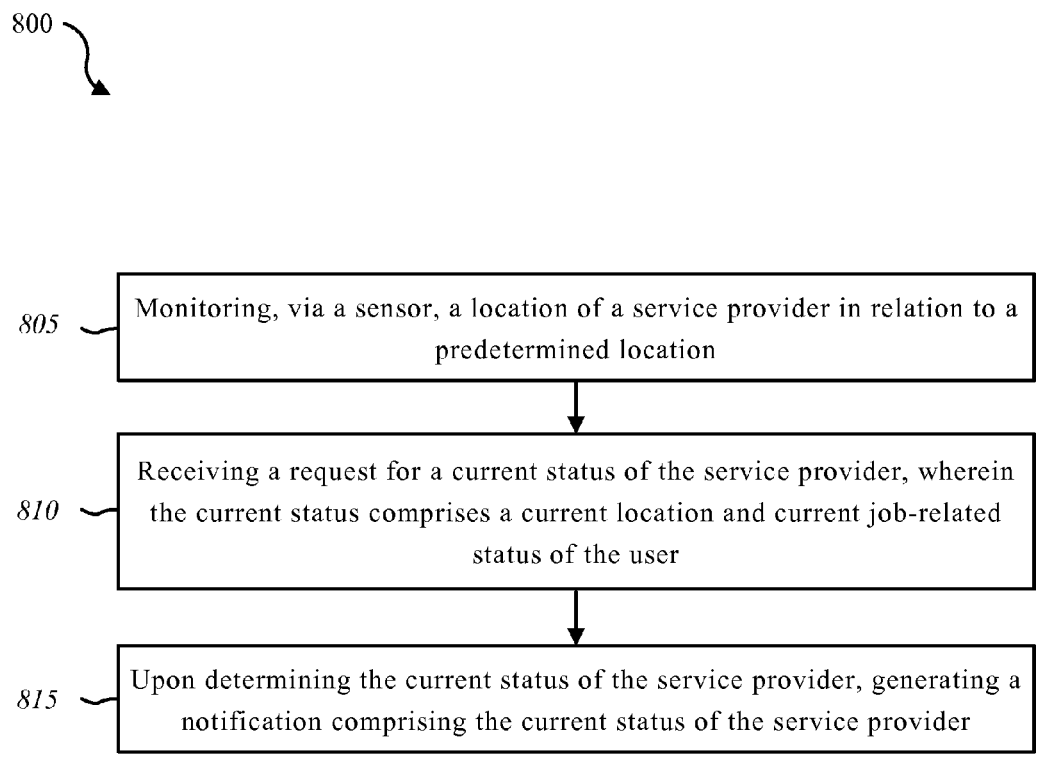
FIG. 8 is a flow diagram illustrating one embodiment of a method for monitoring a status of a service provider.

FIG. 8 is a flow diagram illustrating one embodiment of a method 800 for monitoring a status of a service provider. In some configurations, the method 800 may be implemented by the home automation module 145 illustrated in FIG. 1 or 2. In some configurations, the method 800 may be implemented in conjunction with the application 140 and/or the user interface 135 illustrated in FIG. 1.

At block 805, a location of a service provider may be monitored in relation to a predetermined location. At block 810, a request for a current status of the service provider may be received. The current status may include a current location and current job-related status of the user. At block 815, upon determining the current status of the service provider, a notification including the current status of the service provider may be generated.

Figure 9:
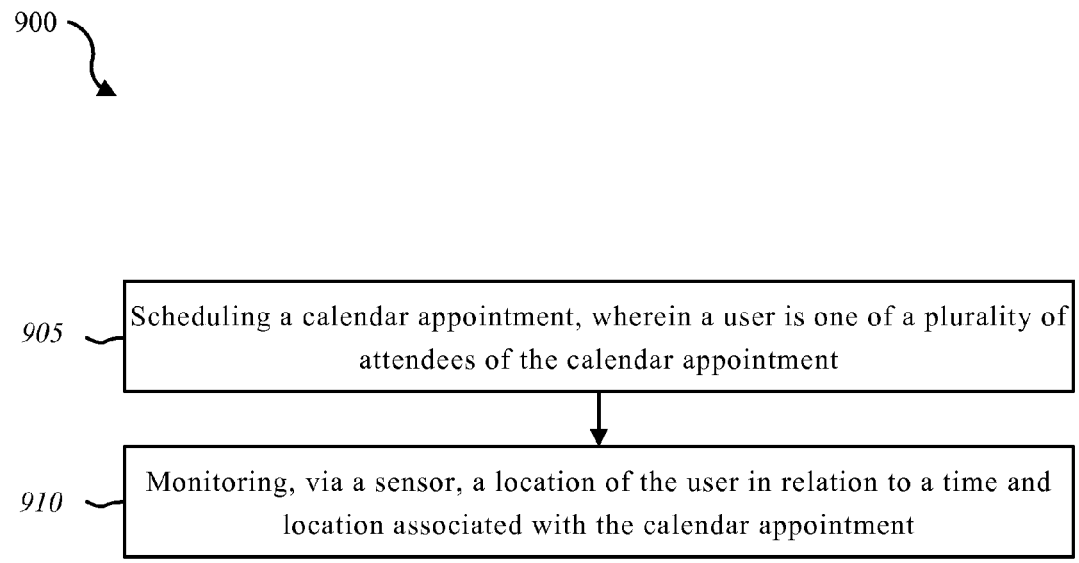
FIG. 9 is a flow diagram illustrating one embodiment of a method for monitoring a location of a user relative to a calendar appointment.

FIG. 9 is a flow diagram illustrating one embodiment of a method 900 for monitoring a location of a user relative to a calendar appointment. In some configurations, the method 900 may be implemented by the home automation module 145 illustrated in FIG. 1 or 2. In some configurations, the method 900 may be implemented in conjunction with the application 140 and/or the user interface 135 illustrated in FIG. 1.

At block 905, a calendar appointment may be scheduled. A user may be one of a plurality of attendees of the calendar appointment. At block 910, a location of the user may be monitored in relation to a time and location associated with the calendar appointment.

Figure 10:
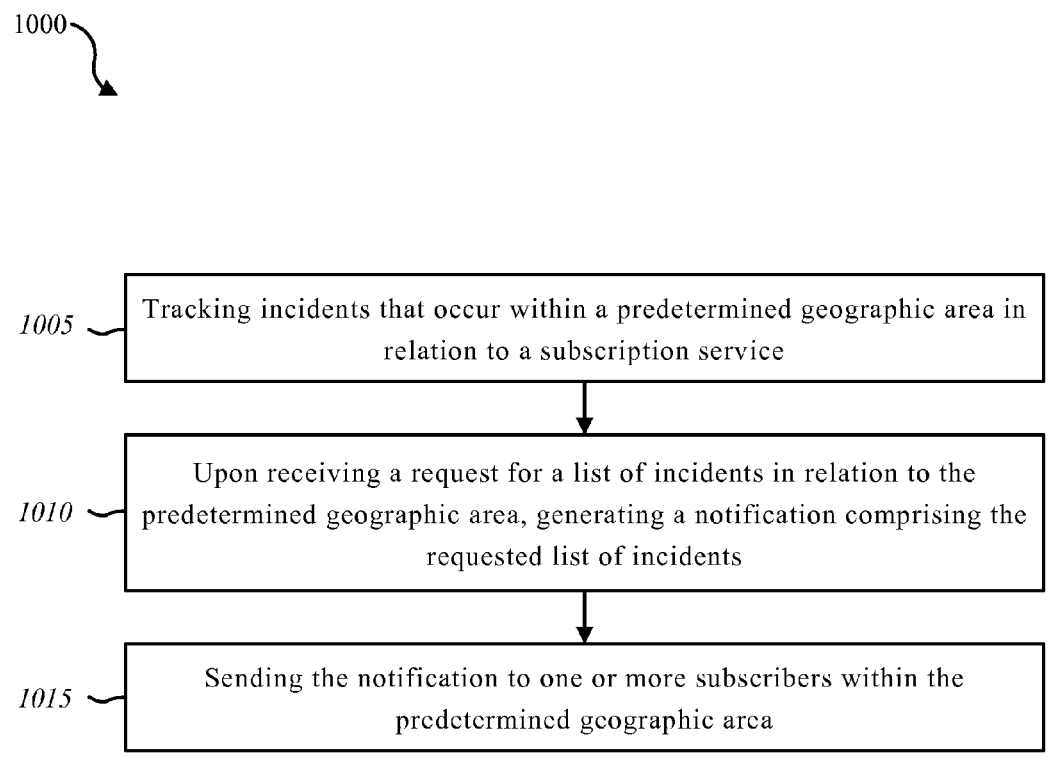
FIG. 10 is a flow diagram illustrating one embodiment of a method for tracking incidents occurring within a geographic area.

FIG. 10 is a flow diagram illustrating one embodiment of a method 1000 for tracking incidents occurring within a geographic area. In some configurations, the method 1000 may be implemented by the home automation module 145 illustrated in FIG. 1 or 2. In some configurations, the method 1000 may be implemented in conjunction with the application 140 and/or the user interface 135 illustrated in FIG. 1.

At block 1005, incidents that occur within a predetermined geographic area may be tracked in relation to a subscription service. At block 1010, upon receiving a request for a list of incidents in relation to the predetermined geographic area, a notification including the requested list of incidents may be generated. At block 1015, the notification may be sent to one or more subscribers within the predetermined geographic area.

Figure 11:
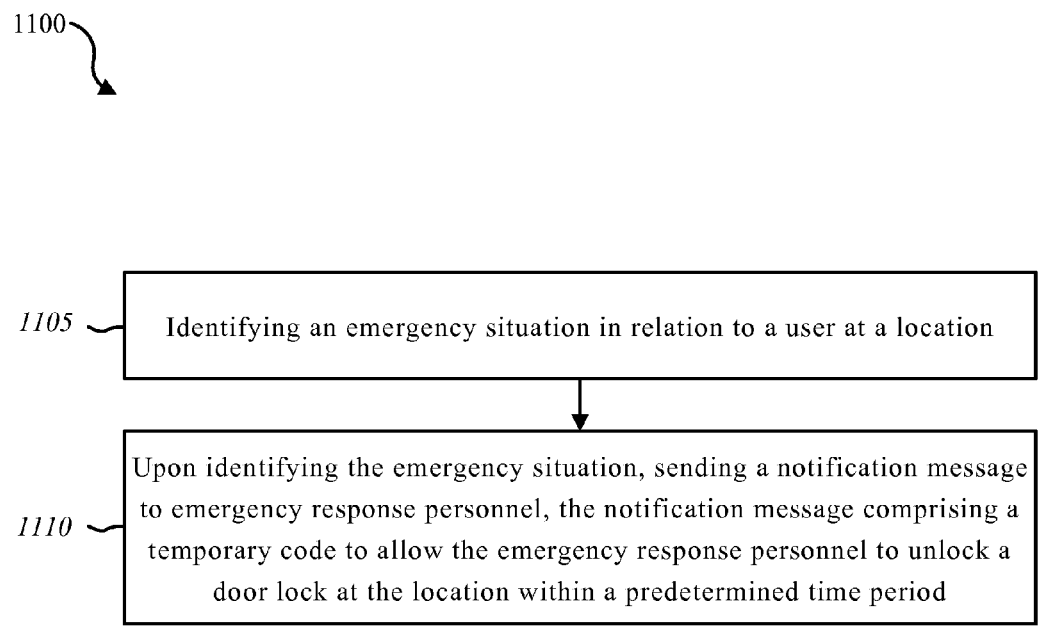
FIG. 11 is a flow diagram illustrating one embodiment of a method for providing a temporary code that unlocks a door to emergency response personnel upon identifying an emergency situation.

FIG. 11 is a flow diagram illustrating one embodiment of a method 1100 for providing a temporary code that unlocks a door to emergency response personnel upon identifying an emergency situation. In some configurations, the method 1100 may be implemented by the home automation module 145 illustrated in FIG. 1 or 2. In some configurations, the method 1100 may be implemented in conjunction with the application 140 and/or the user interface 135 illustrated in FIG. 1.

At block 1105, an emergency situation may be identified in relation to a user at a location. At block 1110, upon identifying the emergency situation, a notification message may be sent to emergency response personnel. The notification message may include a temporary code to allow the emergency response personnel to unlock a door lock at the location within a predetermined time period.

Figure 12:
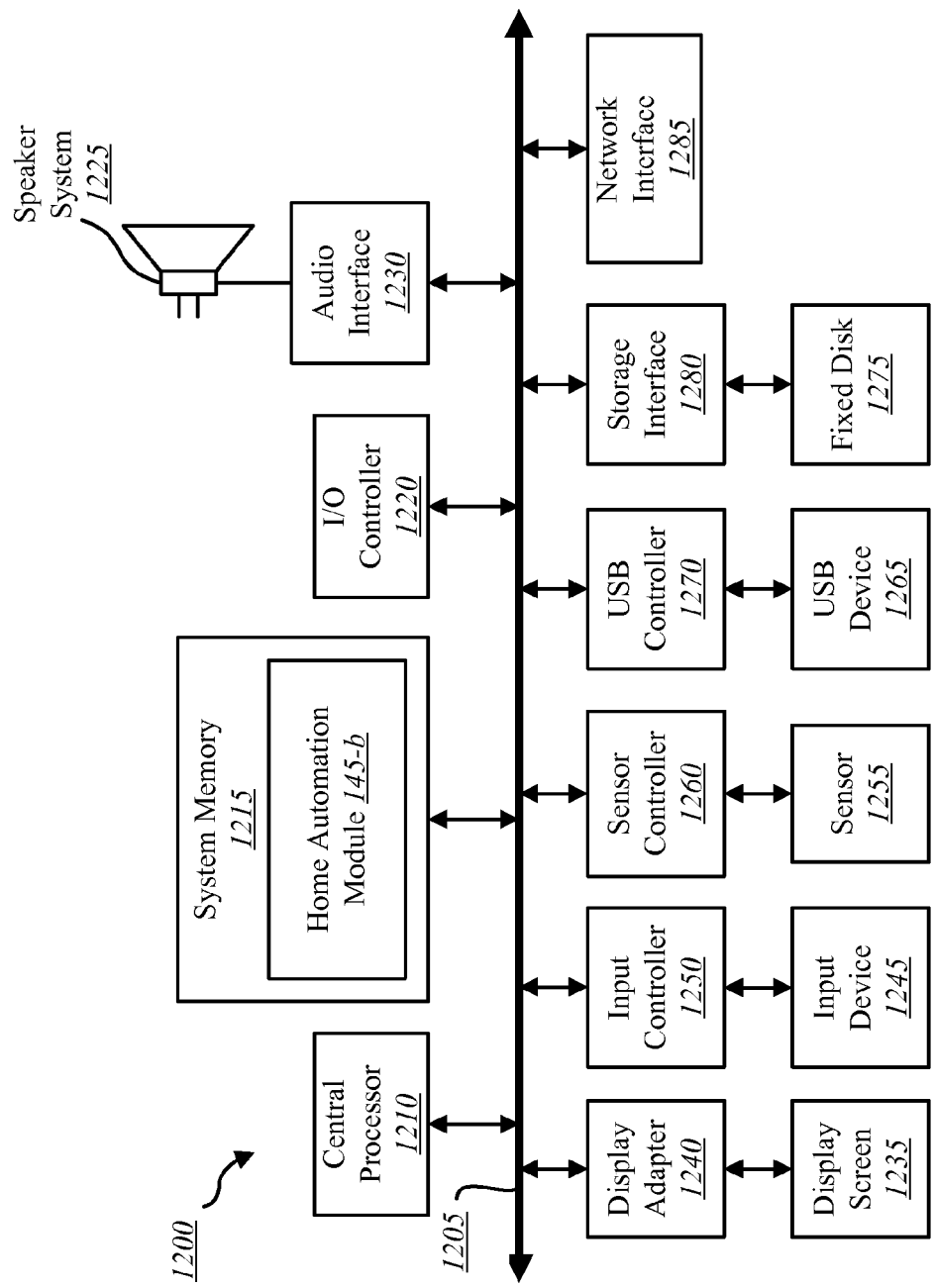
FIG. 12 depicts a block diagram of a computer system suitable for implementing the present systems and methods.

FIG. 12 depicts a block diagram of a controller 1200 suitable for implementing the present systems and methods. The controller 1200 may be an example of the set top box device 105, mobile computing device 150, and/or home automation controller 155 illustrated in FIG. 1. In one configuration, controller 1200 includes a bus 1205 which interconnects major subsystems of controller 1200, such as a central processor 1210, a system memory 1215 (typically RAM, but which may also include ROM, flash RAM, or the like), an input/output controller 1220, an external audio device, such as a speaker system 1225 via an audio output interface 1230, an external device, such as a display screen 1235 via display adapter 1240, an input device 1245 (e.g., remote control device interfaced with an input controller 1250), one or more USB devices 1265 (interfaced with a USB controller 1270), and a storage interface 1280. Also included are at least one sensor 1255 connected to bus 1205 through a sensor controller 1260 and a network interface 1285 (coupled directly to bus 1205).

Bus 1205 allows data communication between central processor 1210 and system memory 1215, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the home automation module 145-*b* to implement the present systems and methods may be stored within the system memory 1215. Applications (e.g., application 140) resident with controller 1200 are generally stored on and accessed via a non-transitory computer readable medium, such as a hard disk drive (e.g., fixed disk 1275) or other storage medium. Additionally, applications can be in the form of electronic signals modulated in accordance with the application and data communication technology when accessed via interface 1285.

Storage interface 1280, as with the other storage interfaces of controller 1200, can connect to a standard computer readable medium for storage and/or retrieval of information, such as a fixed disk drive 1275. Fixed disk drive 1275 may be a part of controller 1200 or may be separate and accessed through other interface systems. Network interface 1285 may provide a direct connection to a remote server via a direct network link to the Internet via a POP (point of presence). Network interface 1285 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to controller 1200 wirelessly via network interface 1285.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 12 need not be present to practice the present systems and methods. The devices and subsystems can be interconnected in different ways from that shown in FIG. 12. The aspect of some operations of a system such as that shown in FIG. 12 are readily known in the art and are not discussed in detail in this application. Code to implement the present disclosure can be stored in a non-transitory computer-readable medium such as one or more of system memory 1215 or fixed disk 1275. The operating system provided on controller 1200 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order best to explain the principles of the present systems and methods and their practical applications, thereby to enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A method for geo-location services, the method comprising:

monitoring, at a control panel of an automation system, in conjunction with a sensor of the automation system, a location of a service provider in relation to a predetermined location;

receiving, at the control panel, a request for a current status of the service provider, wherein the current status comprises a current location of the service provider and a current job-related status of the service provider;

determining, at the control panel, the current status of the service provider; and generating, at the control panel, a notification based at least a part on the determining.

2. The method of claim 1, further comprising:

calculating an estimated time of arrival of the service provider to the predetermined location based on any combination of the current location of the service provider and the current job-related status of the service provider.

3. The method of claim 1, wherein the current job-related status comprises at least one of traveling to a job, on a job, on break, and off work.

4. The method of claim 1, further comprising:

pausing a channel from subscriber program content; and displaying the notification on at least a portion of the paused channel.

5. The method of claim 1, further comprising:

learning a route of the service provider in relation to the predetermined location.

6. The method of claim 5, further comprising:

upon learning the route of the service provider, calculating an estimated time of arrival of the service provider to the predetermined location based on the current location of the service provider in relation to the learned route.

7. The method of claim 5, further comprising:

upon determining the service provider is deviating from the learned route, generating a notification.

8. The method of claim 1, further comprising:

determining a number of remaining appointments of the service provider before an appointment to the predetermined location.

9. The method of claim 8, further comprising:

calculating an estimated time of arrival of the service provider to the predetermined location based on the number of remaining appointments of the service provider.

10. A computing device configured for geo-location services, comprising:

a processor of a control panel of an automation system;

memory in electronic communication with the processor, wherein the memory stores computer executable instructions that when executed by the processor cause the processor to perform the steps of:
- monitoring, in conjunction with a sensor of the automation system, a location of a service provider in relation to a predetermined location;
- receiving a request for a current status of the service provider, wherein the current status comprises a current location of the service provider and a current job-related status of the service provider;
- determining the current status of the service provider; and
- generating a notification based at least a part on the determining.

11. The computing device of claim 10, wherein the instructions executed by the processor cause the processor to perform the steps of:
- calculating an estimated time of arrival of the service provider to the predetermined location based on any combination of the current location of the service provider and the current job-related status of the service provider.

12. The computing device of claim 10, wherein the current job-related status comprises at least one of traveling to a job, on a job, on break, and off work.

13. The computing device of claim 10, wherein the instructions executed by the processor cause the processor to perform the steps of:
- pausing a channel from subscriber program content; and
- displaying the notification on at least a portion of the paused channel.

14. The computing device of claim 10, wherein the instructions executed by the processor cause the processor to perform the steps of:
- learning a route of the service provider in relation to the predetermined location.

15. The computing device of claim 14, wherein the instructions executed by the processor cause the processor to perform the steps of:
- upon learning the route of the service provider, calculating an estimated time of arrival of the service provider to the predetermined location based on the current location of the service provider in relation to the learned route.

16. The computing device of claim 14, wherein the instructions executed by the processor cause the processor to perform the steps of:
- upon determining the service provider is deviating from the learned route, generating a notification.

17. The computing device of claim 10, wherein the instructions executed by the processor cause the processor to perform the steps of:
- determining a number of remaining appointments of the service provider before an appointment to the predetermined location.

18. The computing device of claim 17, wherein the instructions executed by the processor cause the processor to perform the steps of:
- calculating an estimated time of arrival of the service provider to the predetermined location based on the number of remaining appointments of the service provider.

19. A non-transitory computer-readable storage medium storing computer executable instructions that when executed by a processor of an automation system cause the processor to perform the steps of:
- monitoring, in conjunction with a sensor of the automation system, a location of a service provider in relation to a predetermined location;
- receiving a request for a current status of the service provider, wherein the current status comprises a current location of the service provider and a current job-related status of the service provider;
- determining the current status of the service provider; and
- generating a notification based at least a part on the determining.

20. The non-transitory computer readable storage medium of claim 19, wherein the instructions executed by the processor cause the processor to perform the steps of:
- calculating an estimated time of arrival of the service provider to the predetermined location based on any combination of the current location of the service provider and the current job-related status of the service provider.

* * * * *